(12) United States Patent
Zhao

(10) Patent No.: US 8,744,000 B2
(45) Date of Patent: Jun. 3, 2014

(54) METHOD, APPARATUS, AND SYSTEM FOR DIVERSITY TRANSMISSION AND RECEPTION

(71) Applicant: Huawei Technologies Co., Ltd., Shenzhen (CN)

(72) Inventor: Guixue Zhao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/786,264

(22) Filed: Mar. 5, 2013

(65) Prior Publication Data
US 2013/0251061 A1    Sep. 26, 2013

Related U.S. Application Data

(63) Continuation of application No. PCT/CN2012/070523, filed on Jan. 18, 2012.

(30) Foreign Application Priority Data

Jan. 19, 2011  (CN) .......................... 2011 1 0026178

(51) Int. Cl.
*H04L 27/00*  (2006.01)
(52) U.S. Cl.
USPC ........... 375/295; 375/130; 375/136; 375/140; 370/328; 370/329; 370/330; 370/331; 370/332
(58) Field of Classification Search
USPC .......... 375/130, 136, 140; 370/328, 329, 330, 370/336, 345
See application file for complete search history.

(56) References Cited

U.S. PATENT DOCUMENTS

2012/0155440 A1*  6/2012  Long et al. ..................... 370/336

FOREIGN PATENT DOCUMENTS

| CN | 101267233 | * | 9/2008 | ............ H04B 7/005 |
|---|---|---|---|---|
| CN | 101267233 A | | 9/2008 | |
| CN | 101582751 A | | 11/2009 | |
| CN | 101631387 | * | 1/2010 | ............ H04W 72/12 |
| CN | 101631387 A | | 1/2010 | |
| CN | 101754315 | * | 6/2010 | ............ H04W 36/24 |
| CN | 101754315 A | | 6/2010 | |
| CN | 102158268 A | | 8/2011 | |
| WO | WO 01/91476 A2 | | 11/2001 | |
| WO | WO 2007/131296 A1 | | 11/2007 | |

OTHER PUBLICATIONS

International Search Report dated Mar. 29, 2012 in connection with International Patent Application No. PCT/CN2012/070523.
Partial translation of Office Action dated Mar. 15, 2013 in connection with Chinese Patent Application No. 201110026178.X.

* cited by examiner

*Primary Examiner* — Daniel Washburn
*Assistant Examiner* — Eboni Hughes

(57) ABSTRACT

A diversity transmission method in the field of wireless communications technologies includes: classifying services to be transmitted, where the classifications include a high-priority service and a low-priority service; transporting the high-priority service to a first channel and a second channel at the same time to transmit the high-priority service in a diversity protection way, and transporting the low-priority service to the first channel or the second channel to transmit the low-priority service in a non-diversity protection way. The embodiments of the present invention further provides a corresponding method, apparatus and system for diversity reception, and an apparatus and a system for diversity transmission. In the embodiments of the present invention, it is implemented that a spectrum utilization rate is effectively improved and the reliability of diversity transmission of the high-priority service is ensured.

4 Claims, 11 Drawing Sheets

METHOD, APPARATUS, AND SYSTEM FOR DIVERSITY TRANSMISSION AND RECEPTION

CROSS-REFERENCE TO RELATED APPLICATIONS

This application is a continuation of International Application No. PCT/CN2012/070523, filed on Jan. 18, 2012, which claims priority to Chinese Patent Application No. 201110026178.X, filed on Jan. 19, 2011, both of which are hereby incorporated by reference in their entireties.

TECHNICAL FIELD

The present invention relates to the field of wireless communications technologies, and in particular, to a method, an apparatus, and a system for diversity transmission and reception.

BACKGROUND

A digital microwave system mainly completes functions such as mobile backhaul, convergence, and relay. For the reliability of a microwave system, a diversity technology is the most commonly used means currently in the industry. The diversity technology is a method for processing signals of different paths by utilizing different frequencies, separated antennas or a dual-polarized antenna, and reducing or eliminating phase interference by utilizing different routes of an electromagnetic wave at different frequencies, paths or polarization directions. The commonly used diversity technology includes frequency diversity, spatial diversity, and polarization diversity, and its typical block diagram of the principle is shown in FIG. 1. When a first channel and a second channel of a high station/a low station adopt different frequencies, FIG. 1 shows a block diagram of the principle of frequency diversity; when the first channel and the second channel of the high station/the low station adopt a same frequency, and the two antennas adopt the dual-polarized antenna, FIG. 1 shows a block diagram of the principle of polarization diversity; the first channel and the second channel of the low station need to send a cancellation signal to each other for XPIC (cross Polarization Interference Cancellation, cross polarization interference cancellation); and when the first channel and the second channel of the high station/the low station adopt the same frequency, and the two antennas adopt separated antennas, FIG. 1 shows a block diagram of the principle of spatial diversity. The first channel and the second channel are transmission paths of service signals.

The operating principle of a diversity transmission technology shown in FIG. 1 is shown in FIG. 2, and is specifically:

A service 1 and a service 2 are sent to microwave framing units of the first channel and the second channel at the same time, respectively, and the microwave framing units of the first channel and the second channel uniformly place the service 1 and the service 2 in a microwave frame for transmission, that is, service data transmitted in the first channel is the same as that transmitted in the second channel.

The operating principle of a diversity reception technology shown in FIG. 1 is shown in FIG. 3, and is specifically:

Demodulated microwave frame data of the first channel and the second channel is sent to a microwave deframing unit of a diversity reception unit, respectively, and the microwave deframing unit extracts the service 1 and the service 2 from a service data area of the microwave frame, and sends the service 1 and the service 2 to a service selection unit together with a channel quality indication. According to the channel quality indication, the service selection unit selects the service data of the one with better channel quality in the first channel and the second channel for output.

A general format of microwave framing of a diversity transmission unit is shown in the following table.

| Microwave Frame Header | Microwave Frame Overhead | Service Data |
|---|---|---|

The microwave frame header is used to identify a microwave frame. The microwave frame overhead is used for microwave channel management, such as alarm backhaul, ATPC (Automatic Transmit Power Control, automatic transmit power control) delivery and the channel quality delivery. The service data is used to load a service section, such as the service 1 and the service 2 which are in FIG. 1.

The existing diversity technology at least has the following disadvantages:

In a processing process of the diversity technology in the prior art, the service data transported in the first channel and the second channel are identical, and channel protection is performed on all services, which leads to a problem of a low spectrum utilization rate when there are a lot of services with low reliability requirements.

SUMMARY

Embodiments of the present invention provide a method, an apparatus, and a system for diversity transmission and reception, so as to improve a spectrum utilization rate of a diversity technology and simultaneously keep the reliability of the diversity technology.

The embodiments of the present invention are implemented through the following technical solutions.

An embodiment of the present invention provides a diversity transmission method, including:

classifying services to be transmitted, where the classifications include a high-priority service and a low-priority service; and transporting the high-priority service to a first channel and a second channel at the same time to transmit the high-priority service in a diversity protection way, and transporting the low-priority service to the first channel or the second channel to transmit the low-priority service in a non-diversity protection way.

An embodiment of the present invention provides a diversity reception method, including:

receiving services transmitted in a first channel and a second channel;

separating a high-priority service and a low-priority service in the first channel and the second channel; and outputting the low-priority service, and according to channel quality of the first channel and channel quality of the second channel, outputting a high-priority service with relatively higher channel quality in the two channels.

An embodiment of the present invention provides a diversity transmission method, including:

classifying services to be transmitted, where the classifications include a high-priority service and a low-priority service;

judging whether both channel quality of a first channel and channel quality of a second channel are higher than a set threshold value;

if both the channel quality of the first channel and the channel quality of the second channel are higher than the set threshold value, sending the high-priority service and the low-priority service to the first channel and the second channel, respectively, to transmit the high-priority service and the low-priority service in a non-diversity protection way;

otherwise, sending the high-priority service to the first channel and the second channel at the same time to transmit the high-priority service in a diversity protection way.

An embodiment of the present invention provides a diversity reception method, including:

receiving services transmitted in a first channel and a second channel;

judging whether a hybrid microwave frame of the service carries a diversity protection indication or a non-diversity protection indication;

if the non-diversity protection indication is carried, outputting services in the first channel and the second channel, respectively; and if the diversity protection indication is carried, outputting a service with relatively higher channel quality in the two channels according to channel quality of the first channel and channel quality of the second channel.

An embodiment of the present invention provides a diversity transmission apparatus, which includes: a hybrid diversity transmission unit, a microwave transmission unit of a first channel and a microwave transmission unit of a second channel, where the hybrid diversity transmission unit is configured to classify services to be transmitted, where the classifications include a high-priority service and a low-priority service; transport the high-priority service to the microwave transmission unit of the first channel and the microwave transmission unit of the second channel at the same time to transmit the high-priority service in a diversity protection way, and transport the low-priority service to the microwave transmission unit of the first channel or the microwave transmission unit of the second channel to transmit the low-priority service in a non-diversity protection way;

the microwave transmission unit of the first channel is configured to receive, and through the first channel, transmit the service obtained from the hybrid diversity transmission unit; and the microwave transmission unit of the second channel is configured to receive, and through the second channel, transmit the service obtained from the hybrid diversity transmission unit.

An embodiment of the present invention provides a diversity reception apparatus, which includes: a microwave reception unit of a first channel, a microwave reception unit of a second channel, and a hybrid diversity reception unit, where the microwave reception unit of the first channel is configured to receive a service transmitted in the first channel, obtain microwave frame data after demodulation, and transport the microwave frame data to the hybrid diversity reception unit;

the microwave reception unit of the second channel is configured to receive a service transmitted in the second channel, obtain microwave frame data after demodulation, and transport the microwave frame data to the hybrid diversity reception unit; and the hybrid diversity reception unit is configured to separate a high-priority service and a low-priority service in the first channel and the second channel; output the low-priority service, and output a high-priority service with relatively higher channel quality in the two channels according to channel quality of the first channel and channel quality of the second channel.

An embodiment of the present invention provides a diversity transmission apparatus, which includes: a hybrid diversity transmission unit, a microwave transmission unit of a first channel, and a microwave transmission unit of a second channel, where the hybrid diversity transmission unit is configured to classify services to be transmitted, where the classifications include a high-priority service and a low-priority service; judge whether both channel quality of the first channel and channel quality of the second channel are higher than a set threshold value, if both the channel quality of the first channel and the channel quality of the second channel are higher than the set threshold value, transport the high-priority service and the low-priority service to the microwave transmission unit of the first channel and the microwave transmission unit of the second channel, respectively, to transmit the high-priority service and the low-priority service in a non-diversity protection way; otherwise, send the high-priority service to the microwave transmission unit of the first channel and the microwave transmission unit of the second channel at the same time to transmit the high-priority service in a diversity protection way;

the microwave transmission unit of the first channel is configured to receive, and through the first channel, transmit the service obtained from the hybrid diversity transmission unit; and the microwave transmission unit of the second channel is configured to receive, and through the second channel, transmit the service obtained from the hybrid diversity transmission unit.

An embodiment of the present invention provides a diversity reception apparatus, which includes: a microwave reception unit of a first channel, a microwave reception unit of a second channel, and a hybrid diversity reception unit, where the microwave reception unit of the first channel is configured to receive a service transmitted in the first channel, obtain microwave frame data after demodulation, and transport the microwave frame data to the hybrid diversity reception unit;

the microwave reception unit of the second channel is configured to receive a service transmitted in the second channel, obtain microwave frame data after demodulation, and transport the microwave frame data to the hybrid diversity reception unit; and the hybrid diversity reception unit is configured to judge whether a hybrid microwave frame of the service carries a diversity protection indication or a non-diversity protection indication; if the non-diversity protection indication is carried, output services in the first channel and the second channel, respectively; if the diversity protection indication is carried, output a service with relatively higher channel quality in the two channels according to channel quality of the first channel and channel quality of the second channel.

An embodiment of the present invention provides a diversity transmission system, which includes: a diversity transmission apparatus and a diversity reception apparatus, where the diversity transmission apparatus is configured to classify services to be transmitted, where the classifications include a high-priority service and a low-priority service; transport the high-priority service to the first channel and the second channel at the same time to transmit the high-priority service in a diversity protection way, and transport the low-priority service to the first channel or the second channel to transmit the low-priority service in a non-diversity protection way; and the diversity reception apparatus is configured to receive services transmitted in the first channel and the second channel, separate the high-priority service and the low-priority service in the first channel and the second channel; output the low-priority service, and output a high-priority service with relatively higher channel quality in the two channels according to channel quality of the first channel and channel quality of the second channel.

An embodiment of the present invention provides a diversity transmission system, which includes: a diversity transmission apparatus and a diversity reception apparatus, where the diversity transmission apparatus is configured to classify services to be transmitted, where the classifications include a high-priority service and a low-priority service; judge whether both channel quality of a first channel and channel quality of a second channel are higher than a set threshold value, if both the channel quality of the first channel and the channel quality of the second channel are higher than the set threshold value, send the high-priority service and the low-priority service to the first channel and the second channel, respectively, to transmit the high-priority service and the low-priority service in a non-diversity protection way, and a non-diversity protection indication is carried in a transmitted hybrid microwave frame; otherwise, send the high-priority service to the first channel and the second channel at the same time to transmit the high-priority service in a diversity protection way, and a diversity protection indication is carried in a transmitted hybrid microwave frame; and the diversity reception apparatus is configured to receive services transmitted in the first channel and the second channel; judge whether the hybrid microwave frame of the service carries the diversity protection indication or the non-diversity protection indication; if the non-diversity protection indication is carried, output services in the first channel and the second channel, respectively; and if the diversity protection indication is carried, output a service with relatively higher channel quality in the two channels according to channel quality of the first channel and channel quality of the second channel.

It can be seen from the technical solutions provided in the foregoing embodiments of the present invention that, in the embodiments of the present invention, it is implemented that a spectrum utilization rate is effectively improved and the reliability of diversity transmission of the high-priority service is simultaneously ensured.

DETAILED DESCRIPTION

The technical solutions in embodiments of the present invention are clearly and completely described in the following with reference to the accompanying drawings in the embodiments of the present invention. It should be understood that the embodiments to be described are only a part rather than all of the embodiments of the present invention. All other embodiments obtained by persons of ordinary skill in the art based on the embodiments of the present invention without making creative efforts shall fall within the protection scope of the present invention.

Embodiment 1

Figure 1:
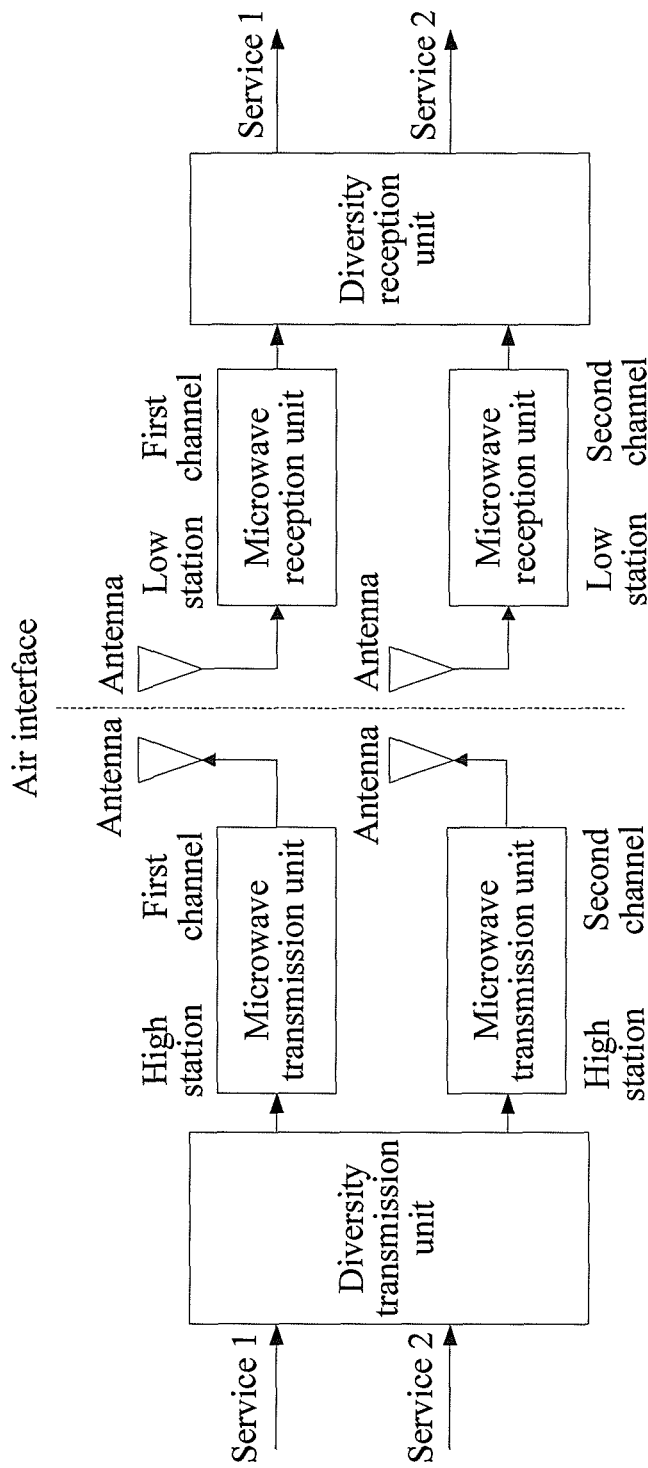
FIG. 1 is a block diagram of a principle of an existing diversity technology.
Figure 2:
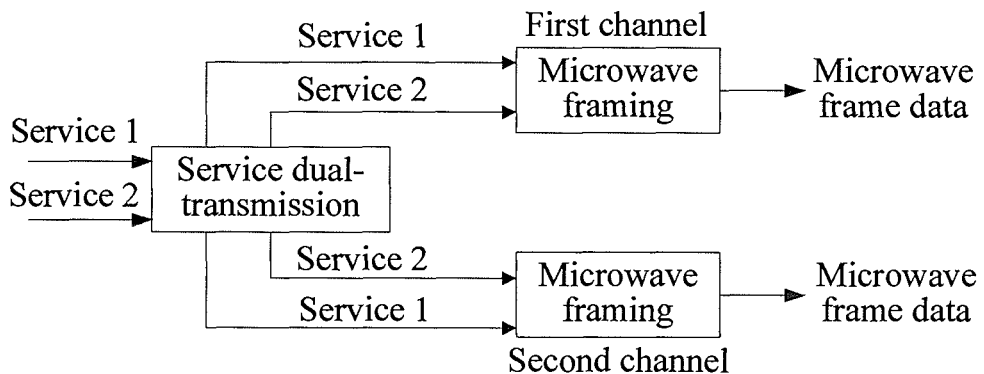
FIG. 2 is a schematic diagram of a principle of an existing diversity transmission technology.
Figure 3:
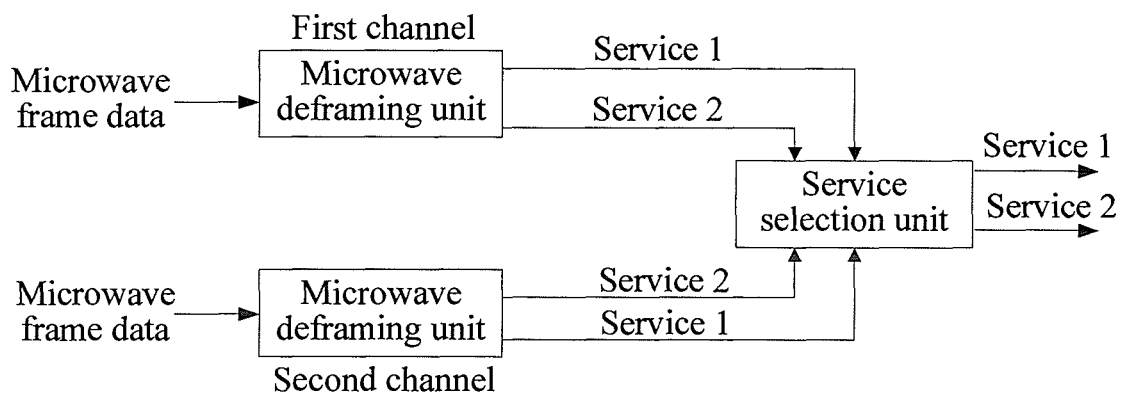
FIG. 3 is a schematic diagram of a principle of an existing diversity reception technology.
Figure 4:
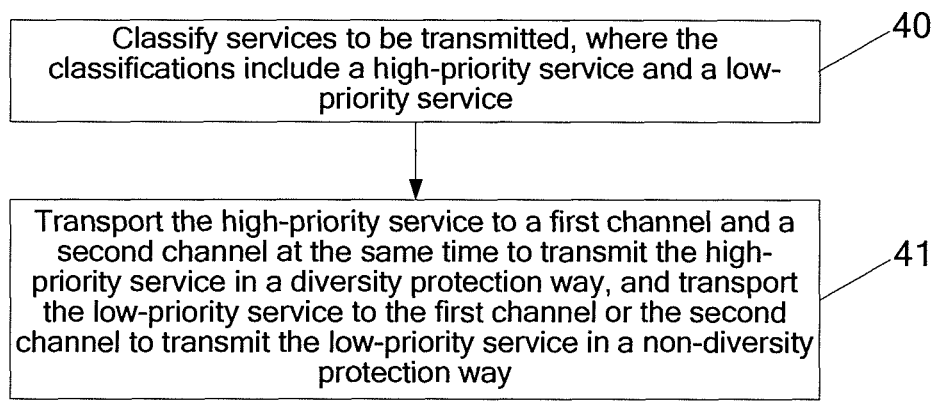
FIG. 4 is a flow chart of a diversity transmission method according to Embodiment 1 of the present invention.

Embodiment 1 of the present invention provides a diversity transmission method, which is shown in FIG. 4, and includes the following steps.

Step 40: Classify services to be transmitted, where the classifications include a high-priority service and a low-priority service.

A method which is for classifying the services to be transmitted and is described in the embodiment of the present invention includes: classifying according to a preset rule or forcefully setting a service level by a system. For example, the classification based on the preset rule is: classifying according to reliability requirements, and a service requiring high reliability, such as voice and real-time data, is defined as the high-priority service; a service requiring low reliability, such as common data, is defined as the low-priority service. The service level forcefully set by the system is higher than the service level classified according to the preset rule.

In the embodiment of the present invention, the classification method is only described with the foregoing examples, and the specific classification method is not limited in the embodiment of the present invention.

Step 41: Transport the high-priority service to a first channel and a second channel at the same time to transmit the high-priority service in a diversity protection way, and transport the low-priority service to the first channel or the second channel to transmit the low-priority service in a non-diversity protection way.

The transporting the high-priority service to the first channel and the second channel at the same time to transmit the high-priority service in a diversity protection way includes: extracting related information of the high-priority service, for example, a length, and transporting the high-priority service and the service related information to the first channel and the second channel at the same time.

According to a specific rule, in the first channel or the second channel, the low-priority service and the high-priority service form a hybrid microwave frame for transmission. The hybrid microwave frame carries a diversity service pointer, and the diversity service pointer is used to indicate a start address and a length of a diversity service. The information, for example, the length, related to the high-priority service needs to be extracted when the low-priority service and the high-priority service form the hybrid microwave frame. Alternatively, the hybrid microwave frame carries a non-diversity service pointer, and the non-diversity service pointer is used to indicate a start address and a length of a non-diversity service. The information, for example, the length, related to the low-priority service needs to be extracted when the low-priority service and the high-priority service form the hybrid microwave frame.

In the embodiment of the present invention, the low-priority service is transported to the first channel or the second channel to transmit the low-priority service in a non-diversity protection way, thereby implementing maximum capacity transmission. For example, a first low-priority service is transported to the first channel, a second low-priority service is transported to the second channel; in the first channel, the first low-priority service and the high-priority service form a hybrid microwave frame for transmission; and in the second channel, the second low-priority service and the high-priority service are combined into a hybrid microwave frame for transmission, thereby improving a spectrum utilization rate and simultaneously ensuring the reliability of transmission of the high-priority service.

A format of a hybrid microwave frame provided in the embodiment of the present invention is as follows.

| Microwave Frame Header | Microwave frame overhead | Diversity Service Pointer | Diversity Service Area | Non-Diversity Service Area |
| --- | --- | --- | --- | --- |

The microwave frame header is used to identify a microwave frame.

The microwave frame overhead is used for microwave channel management, such as alarm backhaul, ATPC delivery, and channel quality delivery.

The diversity service pointer is used to indicate the start address and the length of the diversity service, so as to combine and divide a microwave frame service conveniently. A value range of the diversity service pointer is between 0 and the length of a whole service area, that is, a sum of the diversity service area and the non-diversity service area. When the value is 0, it indicates that the microwave frame has no diversity protection service; and when the value is the length of the whole service area, it indicates that all that in the microwave frame is a diversity protection service.

The diversity service area: a service that requires diversity protection is the high-priority service; and the part of service needs to be transmitted in the first channel and the second channel at the same time, so as to reach a diversity protection effect.

The non-diversity service area: a service that does not require diversity protection is the low-priority service; and the part of service is transmitted only in the first channel or the second channel and is not associated with another channel.

The format of another hybrid microwave frame may be as follows.

| Microwave Frame Header | Microwave frame overhead | Non-Diversity Service Pointer | Non-Diversity Service Area | Diversity Service Area |
| --- | --- | --- | --- | --- |

The non-diversity service pointer is used to indicate the start address and the length of the non-diversity service, so as to combine and divide the microwave frame service conveniently. A value range of the non-diversity service pointer is between 0 and the length of the whole service area, that is, the sum of the diversity service area and the non-diversity service area. When the value is 0, it indicates that the microwave frame has no non-diversity protection service; and when the value is the length of the whole service area, it indicates that all that in the microwave frame is a non-diversity protection service.

The microwave frame data in the first channel and the second channel, after modulation, digital-to-analog conversion, filtering, frequency conversion, and amplification processing by their microwave transmission units, is transmitted through an antenna.

In the embodiment of the present invention, the services to be transmitted are classified into the high-priority service and the low-priority service, a diversity protection function is adopted for the high-priority service, and the low-priority service is transmitted in a non-diversity protection way. It is implemented that the spectrum utilization rate is effectively improved and the reliability of diversity transmission of the high-priority service is simultaneously ensured.

Embodiment 2

Figure 5:
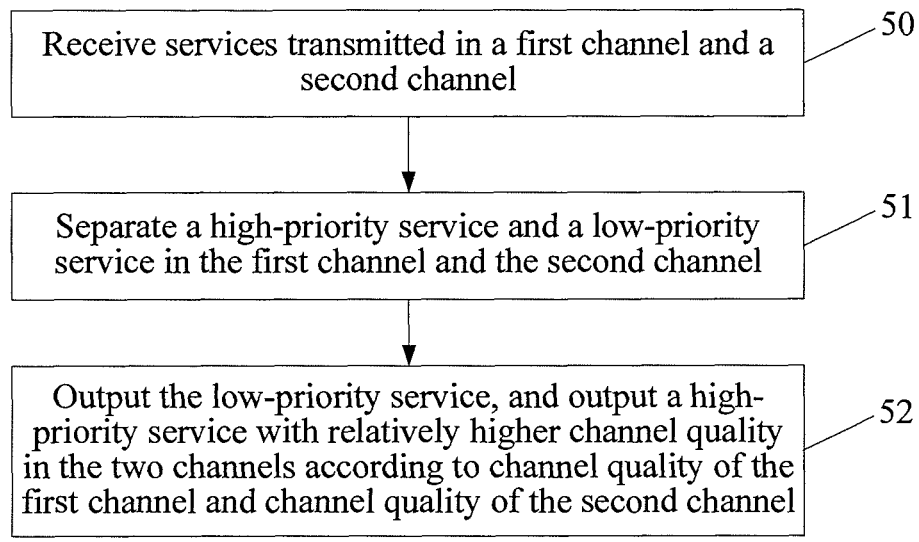
FIG. 5 is a flow chart of a diversity reception method according to Embodiment 2 of the present invention.

Embodiment 2 of the present invention provides a diversity reception method, the diversity reception method described in this embodiment corresponds to the diversity transmission method described in Embodiment 1, that is, the received service is transmitted by adopting the transmission method described in Embodiment 1. As shown in FIG. 5, the diversity reception method described in this embodiment specifically includes the following steps.

Step 51: Receive services transmitted in a first channel and a second channel.

In specific implementation, a microwave reception unit performs frequency conversion, filtering, amplification, analog-to-digital conversion and demodulation on the received signal to output hybrid microwave frame data.

Step 52: Separate a high-priority service and a low-priority service in the first channel and the second channel.

The method for separating the high-priority service and the low-priority service in the first channel and the second channel described in the embodiment of the present invention includes:

demodulating a hybrid microwave frame of the service transmitted in the first channel and the second channel, where the hybrid microwave frame carries a diversity service pointer or a non-diversity service pointer; and separating the high-priority service and the low-priority service in the first channel and the second channel according to the diversity service pointer or the non-diversity service pointer.

Step 53: Output the low-priority service, and output a high-priority service with relatively higher channel quality in the two channels according to channel quality of the first channel and channel quality of the second channel.

In the embodiment of the present invention, the separated low-priority service is directly output; the high-priority services separated from the two channels are selectively output according to the channel quality of the two channels, that is, the high-priority service transmitted in the channel with higher channel quality is selected.

For example, a service 1 and a service 2 are separated from the first channel, where the service 1 is the low-priority service transmitted via non-diversity protection, and the service 2 is the high-priority service transmitted via diversity protection. The service 2 and a service 3 are separated from the second channel, where the service 2 is the high-priority service transmitted via the diversity protection, and the service 3 is the low-priority service transmitted via the non-diversity protection. Then, the service 1 and the service 3 are directly output. If the channel quality of the first channel is higher than that of the second channel, the service 2 in the first channel with higher channel quality is output.

A parameter included in the channel quality in the embodiment of the present invention includes any one or more of the following: receiving power, a signal-to-noise ratio, a demodulation alarm and a bit error rate, and an MSE (mean square error) of the channel.

In the embodiment of the present invention, it is implemented that a spectrum utilization rate is effectively improved and the reliability of diversity transmission of the high-priority service is simultaneously ensured.

Embodiment 3

Figure 6:
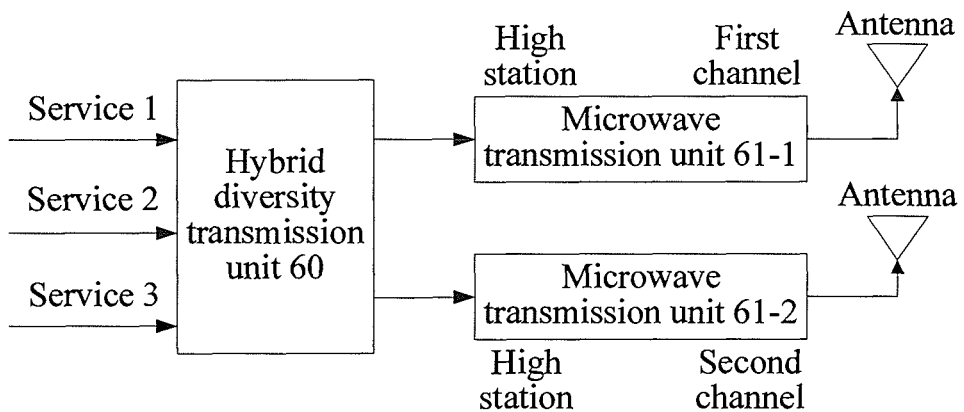
FIG. 6 is a block diagram of a principle of a diversity transmission apparatus according to Embodiment 3 of the present invention.

Embodiment 3 of the present invention provides a diversity transmission apparatus, where the diversity transmission apparatus corresponds to Embodiment 1, and is configured to implement the diversity transmission method described in Embodiment 1. A block diagram of a principle of this transmission apparatus is shown in FIG. 6. The diversity transmission apparatus described in this embodiment includes: a hybrid diversity transmission unit 60, a microwave transmission unit 61-1 of a first channel, and a microwave transmission unit 61-2 of a second channel.

The hybrid diversity transmission unit 60 is configured to classify services to be transmitted, where the classifications include a high-priority service and a low-priority service; transport the high-priority service to the microwave transmission unit 61-1 of the first channel and the microwave transmission unit 61-2 of the second channel at the same time to transmit the high-priority service in a diversity protection way, and transport the low-priority service to the microwave transmission unit 61-1 of the first channel or the microwave transmission unit 61-2 of the second channel to transmit the low-priority service in a non-diversity protection way.

The microwave transmission unit 61-1 of the first channel is configured to receive, and through the first channel, transmit a service obtained from the hybrid diversity transmission unit 60.

The microwave transmission unit 61-2 of the second channel is configured to receive, and through the second channel, transmit a service obtained from the hybrid diversity transmission unit 60.

It may be understood that, to highlight the inventive concept of the present invention, the introduction of the original structure and functions of the diversity transmission apparatus is omitted in the embodiment of the present invention.

Figure 7:
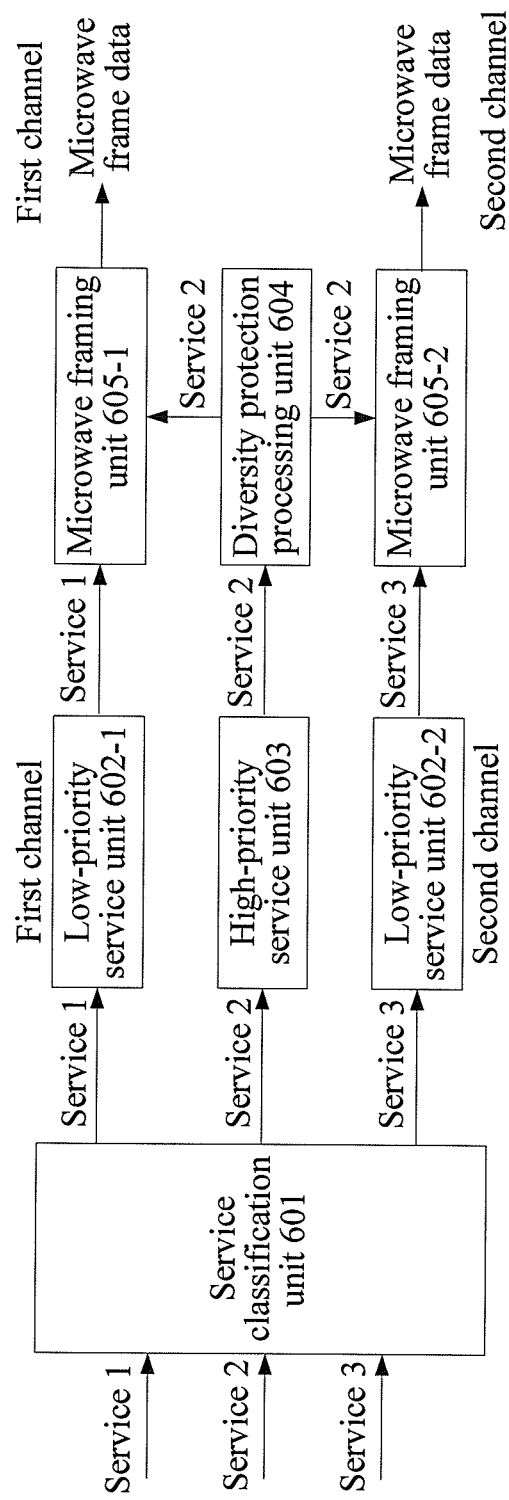
FIG. 7 is a schematic structural diagram of a hybrid diversity transmission unit in a diversity transmission apparatus according to Embodiment 3 of the present invention.

The structure and an operating principle of the hybrid diversity transmission unit 60 described in the embodiment of the present invention are shown in FIG. 7. The hybrid diversity transmission unit 60 may further include: a service classification unit 601, a low-priority service unit 602-1 of the first channel, a low-priority service unit 602-2 of the second channel, a high-priority service unit 603, a diversity protection processing unit 604, a microwave framing unit 605-1 of the first channel, and a microwave framing unit 605-2 of the second channel.

The service classification unit 601 is configured to classify services to be transmitted, transport a classified high-priority service to the high-priority service unit 603, and transport a classified low-priority service to the low-priority service unit 602-1 of the first channel or the low-priority service unit 602-2 of the second channel. As shown in FIG. 7, services to be transmitted include a service 1, a service 2 and a service 3. The service classification unit 601 classifies the service 2 as the high-priority service, and transports the service 2 to the high-priority service unit 603; and classifies the service 1 and the service 3 as the low-priority service, transports the service 1 to the low-priority service unit 602-1 of the first channel, and transports the service 3 to the low-priority service unit 602-2 of the second channel.

The low-priority service unit 602-1 of the first channel is configured to receive the low-priority service which is of the first channel and is transported by the service classification unit 601, and extract information, for example, a length, related to the low-priority service of the first channel.

The low-priority service unit 602-2 of the second channel is configured to receive the low-priority service which is of the second channel and is transported by the service classification unit 601, and extract information, for example, a length, related to the low-priority service of the second channel.

The high-priority service unit 603 is configured to receive the high-priority service transported by the service classification unit 601, and extract information, for example, the length, related to the high-priority service.

The diversity protection unit 604 is configured to transport the high-priority service and service related information in the high-priority service unit 603 to a hybrid microwave framing unit 605-1 of the first channel and a hybrid microwave framing unit 605-2 of the second channel at the same time. As shown in FIG. 7, the service 2 and service related information in the high-priority service unit 603 are transported to the hybrid microwave framing unit 605-1 of the first channel and the hybrid microwave framing unit 605-2 of the second channel at the same time.

The hybrid microwave framing unit 605-1 of the first channel is configured to form the low-priority service in the low-priority service unit 602-1 of the first channel and the high-priority service sent by the diversity protection unit 604 into a hybrid microwave frame; as in FIG. 7, the hybrid microwave framing unit 605-1 of the first channel forms the service 1 and the service 2 into the hybrid microwave frame.

The hybrid microwave framing unit 605-2 of the second channel is configured to form the low-priority service in the low-priority service unit 602-2 of the second channel and the high-priority service sent by the diversity protection unit 604 into the hybrid microwave frame; as in FIG. 7, the hybrid microwave framing unit 605-2 of the second channel forms the service 2 and the service 3 into the hybrid microwave frame.

The structure of the hybrid microwave frame described in the embodiment of the present invention is the same as that in the description of Embodiment 1, which is not repeatedly described here again.

The diversity transmission apparatus described in the embodiment of the present invention classifies services to be transmitted into the high-priority service and the low-priority service, a diversity protection function is adopted for the high-priority service, and the low-priority service is transmitted in a non-diversity protection way, and it is implemented that a spectrum utilization rate is effectively improved and the reliability of diversity transmission of the high-priority service is simultaneously ensured.

Embodiment 4

Figure 8:
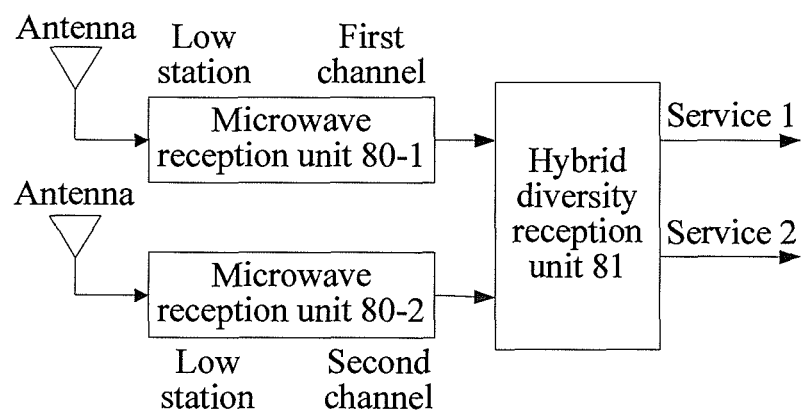
FIG. 8 is a block diagram of a principle of a diversity reception apparatus according to Embodiment 4 of the present invention.

Embodiment 4 of the present invention provides a diversity reception apparatus. The diversity reception apparatus corresponds to Embodiment 2, and is configured to implement the diversity reception method described in Embodiment 2. As shown in FIG. 8, the diversity reception apparatus includes: a microwave reception unit 80-1 of a first channel, a microwave reception unit 80-2 of a second channel, and a hybrid diversity reception unit 81.

The microwave reception unit 80-1 of the first channel is configured to receive a service transmitted in the first channel, obtain microwave frame data after demodulation, and transport the microwave frame data to the hybrid diversity reception unit 81. The specific operation of the microwave reception unit 80-1 of the first channel includes: after receiving a signal transmitted in the first channel through an antenna, performing operations such as frequency conversion, filtering, amplification, analog-to-digital conversion, and demodulation, and finally outputting microwave frame data and transporting the microwave frame data to the hybrid diversity reception unit 81.

The microwave reception unit 80-2 of the second channel is configured to receive a service transmitted in the second channel, obtain the microwave frame data after demodulation, and transport the microwave frame data to the hybrid diversity reception unit 81. The specific operation of the microwave reception unit 80-2 of the second channel includes: after receiving a signal transmitted in the second channel through an antenna, performing operations such as frequency conversion, filtering, amplification, analog-to-digital conversion, and demodulation, and finally outputting microwave frame data and transporting the microwave frame data to the hybrid diversity reception unit 81.

The hybrid diversity reception unit 81 is configured to separate a high-priority service and a low-priority service in the first channel and the second channel; output the low-priority service, and output a high-priority service with relatively higher channel quality in the two channels according to channel quality of the first channel and channel quality of the second channel.

Figure 9:
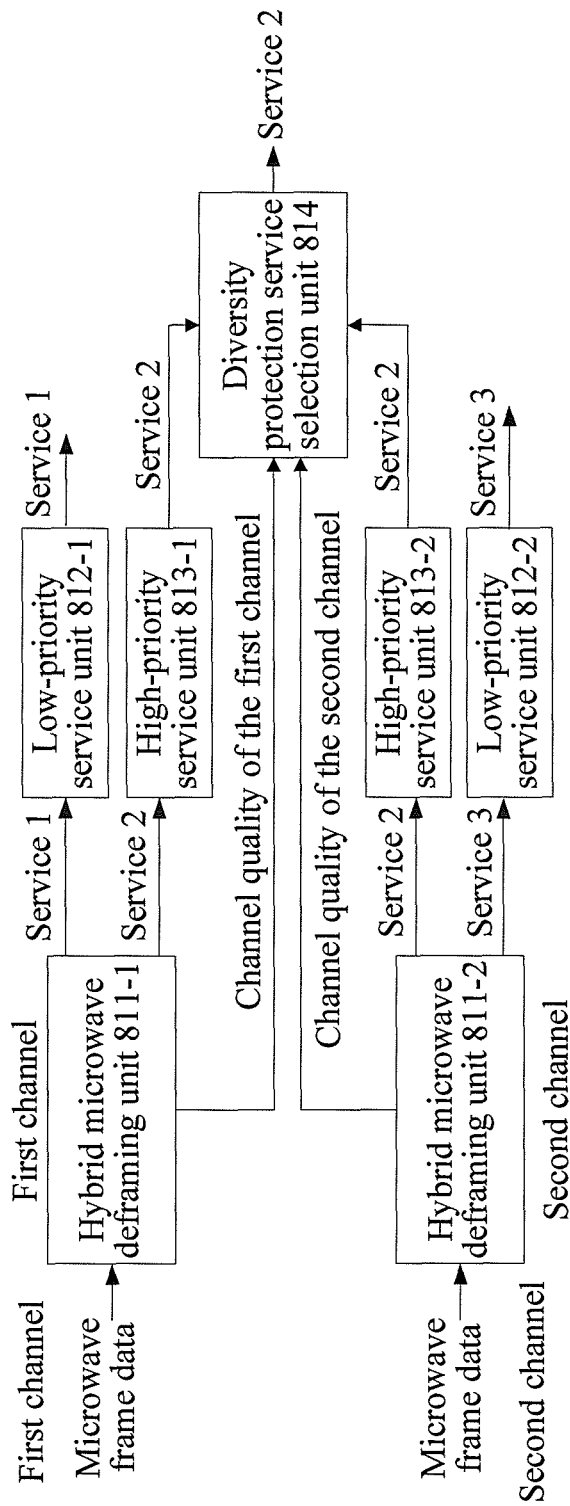
FIG. 9 is a schematic structural diagram of a hybrid diversity reception unit in a diversity reception apparatus according to Embodiment 4 of the present invention.

A structure and an operating principle of the hybrid diversity reception unit 81 described in the embodiment of the present invention are shown in FIG. 9. The hybrid diversity reception unit 81 may further include: a hybrid microwave deframing unit 811-1 of the first channel, a hybrid microwave deframing unit 811-2 of the second channel, a low-priority service unit 812-1 of the first channel, a low-priority service unit 812-2 of the second channel, a high-priority service unit 813-1 of the first channel, a high-priority service unit 813-2 of the second channel, and a diversity protection service selection unit 814.

The hybrid microwave deframing unit 811-1 of the first channel is configured to separate the high-priority service and the low-priority service in the first channel according to a diversity service pointer or a non-diversity service pointer in a microwave frame transmitted in the first channel, send the separated low-priority service to the low-priority service unit 812-1 of the first channel, send the high-priority service to the high-priority service unit 813-1 of the first channel; and send the channel quality of the first channel to the diversity protection service selection unit 814. The diversity service pointer is used to indicate a start address and a length of a diversity service. For example, in FIG. 9, the hybrid microwave deframing unit 811-1 of the first channel separates a high-priority service 2 and a low-priority service 1 according to the diversity service pointer in a hybrid microwave frame in the first channel, transports the high-priority service 2 to the high-priority service unit 813-1 of the first channel, and transports the low-priority service 1 to the low-priority service unit 812-1 of the first channel. In addition, the hybrid microwave deframing unit 811-1 of the first channel may further obtain the channel quality of the first channel, and send the channel quality of the first channel to the diversity protection service selection unit 814. The channel quality includes any one or more of the following parameters: receiving power, a signal-to-noise ratio, a demodulation alarm, a bit error rate, and an MSE of the channel.

The hybrid microwave deframing unit 811-2 of the second channel is configured to separate the high-priority service and the low-priority service in the second channel according to a diversity service pointer or a non-diversity service pointer in a microwave frame transmitted in the second channel, send the separated low-priority service to the low-priority service unit 812-2 of the second channel, send the high-priority service to the high-priority service unit 813-2 of the second channel; and send the channel quality of the second channel to the diversity protection service selection unit 814. For example, in FIG. 9, the hybrid microwave deframing unit 811-2 of the second channel separates the high-priority service 2 and a low-priority service 3 according to the diversity service pointer in a hybrid microwave frame in the second channel, transports the high-priority service 2 to the high-priority service unit 813-2 of the second channel, and transports the low-priority service 3 to the low-priority service unit 812-2 of the second channel. In addition, the hybrid microwave deframing unit 811-2 of the second channel may further obtain the channel quality of the second channel, send the channel quality of the second channel to the diversity protection service selection unit 814. The channel quality includes any one or more of the following parameters: receiving power, a signal-to-noise ratio, a demodulation alarm, a bit error rate, and an MSE of the channel.

The low-priority service unit 812-1 of the first channel and the low-priority service unit 812-2 of the second channel are configured to output the received low-priority services. As shown in FIG. 9, the low-priority service unit 812-1 of the first channel directly outputs the low-priority service 1, and the low-priority service unit 812-2 of the second channel directly outputs the low-priority service 3.

The high-priority service unit 813-1 of the first channel is configured to transport the high-priority service separated by the hybrid microwave deframing unit of the first channel to the diversity protection service selection unit 814.

The high-priority service unit 813-2 of the second channel is configured to transport the high-priority service separated by the hybrid microwave deframing unit of the second channel to the diversity protection service selection unit 814.

The diversity protection service selection unit 814 is configured to select and output a high-priority service with relatively higher channel quality in the two channels according to channel quality of the first channel and channel quality of the second channel. The diversity protection service selection unit 814, after obtaining the channel quality of the two channels from the hybrid microwave deframing unit 811-1 of the first channel and the hybrid microwave deframing unit 811-2 of the second channel, judges the channel quality of which channel is relatively higher so as to output the high-priority service of the corresponding channel. For example, the receiving power of the channel is judged to determine that the channel quality of the first channel is higher than the channel quality of the second channel, and the high-priority service 2 transported by the high-priority service unit 813-1 of the first channel is output; otherwise, the high-priority service 2 transported by the high-priority service unit 813-2 of the second channel is output.

In the embodiment of the present invention, it is implemented that a spectrum utilization rate is effectively improved and the reliability of diversity transmission of the high-priority service is simultaneously ensured.

Embodiment 5

Figure 10:
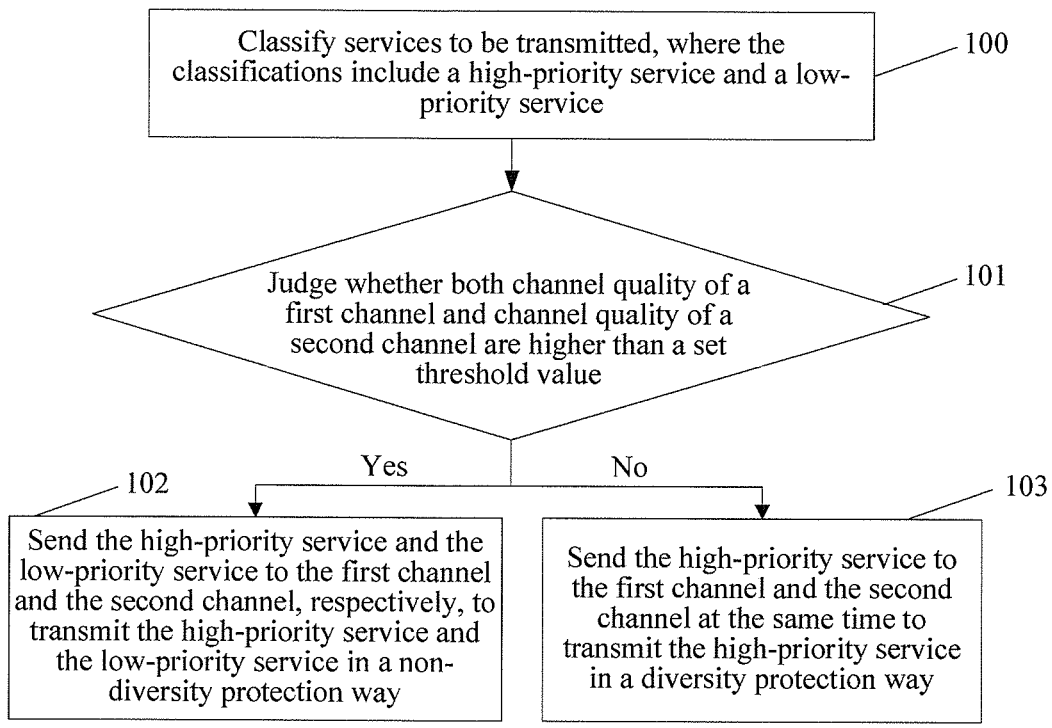
FIG. 10 is a flow chart of a diversity transmission method according to Embodiment 5 of the present invention.

Embodiment 5 of the present invention provides a diversity transmission method, which is shown in FIG. 10, and specifically includes the following steps.

Step 100: Classify services to be transmitted, where the classifications include a high-priority service and a low-priority service.

The method for classifying the services to be transmitted in the embodiment of the present invention includes: classifying according to a preset rule or forcefully setting a service level by a system. For example, the classification according to the preset rule is: classifying according to reliability requirements, and a service requiring high reliability, such as voice and real-time data, is defined as the high-priority service; and the service requiring low reliability, such as common data, is defined as the low-priority service. The service level set by the system is higher than the service priority classified according to the preset rule.

In the embodiment of the present invention, the classification method is only described with the foregoing example, and the specific classification method is not limited in the embodiment of the present invention.

Step 101: Judge whether both channel quality of a first channel and channel quality of a second channel are higher than a set threshold value.

The channel quality of the first channel and the channel quality of the second channel may be obtained from microwave reception units of the channels. The set threshold value is a set condition required for stable working of different modulation modes, and specific parameters include receiving power, a signal-to-noise ratio, a demodulation alarm, or a bit error rate.

If both the channel quality of the first channel and the channel quality of the second channel are higher than the set threshold value, execute step 102; otherwise, execute step 103.

Step 102: Send the high-priority service and the low-priority service to the first channel and the second channel, respectively, to transmit the high-priority service and the low-priority service in a non-diversity protection way.

That is, in a case that it is determined that both the channel quality of the first channel and the channel quality of the second channel are higher than the set threshold value, it may be determined that service transmission through the two channels is reliable, and both the high-priority service and the low-priority service may be transmitted in a non-diversity protection way. For example, the high-priority service is sent to the first channel for transmission, and the low-priority service is sent to the second channel for transmission; or the high-priority service is sent to the second channel for transmission, and the low-priority service is sent to the first channel for transmission.

In this case, if the high-priority service and the low-priority service are sent to the first channel and the second channel, respectively, to transmit the high-priority service and the low-priority service in a non-diversity protection way, a hybrid microwave frame transmitted in the first channel and the second channel carries a non-diversity protection indication.

Step 103: Send the high-priority service to the first channel and the second channel at the same time to transmit the high-priority service in a diversity protection way.

That is, in a case that it is not satisfied that the channel quality of the first channel and the channel quality of the second channel are higher than the set threshold value, only the high-priority service is transmitted, and the high-priority service is transmitted in a diversity protection way, that is, related information of the high-priority service is extracted, and the high-priority service and the service related information are sent to the first channel and the second channel at the same time for transmission.

In this case, if the high-priority service is transmitted in a diversity protection way, a hybrid microwave frame transmitted in the first channel and the second channel carries a diversity protection indication.

A structure of the transmitted hybrid microwave frame in the embodiment of the present invention is shown as follows.

| Microwave Frame Header | Microwave frame overhead | Diversity Protection Pointer or Non-Diversity Protection Pointer | Service Area |
|---|---|---|---|

The microwave frame header is used to identify a microwave frame.

The microwave frame overhead is used for microwave channel management, such as alarm backhaul, ATPC delivery, and channel quality delivery.

The diversity protection pointer or the non-diversity protection pointer is used to indicate whether the service of the service area is configured with the diversity protection or the non-diversity protection. For example, a state A represents that the diversity protection is configured, and a state B represents that the non-diversity protection is configured. For example, when the diversity protection pointer or the non-diversity protection pointer is set to 0, it indicates that the diversity protection is configured, and 1 indicates that the non-diversity protection is configured; or when the diversity protection pointer or the non-diversity protection pointer is set to 0, it indicates that the non-diversity protection is configured, and 1 indicates the diversity protection. It may be understood that, the value of the diversity protection pointer or the non-diversity protection pointer is not limited to 0 or 1.

In the embodiment of the present invention, a diversity protection transmission mode or a non-diversity protection transmission mode is dynamically selected according to the channel quality, thereby improving a spectrum utilization rate of a diversity technology effectively and simultaneously ensuring the reliability of the diversity technology.

Embodiment 6

Figure 11:
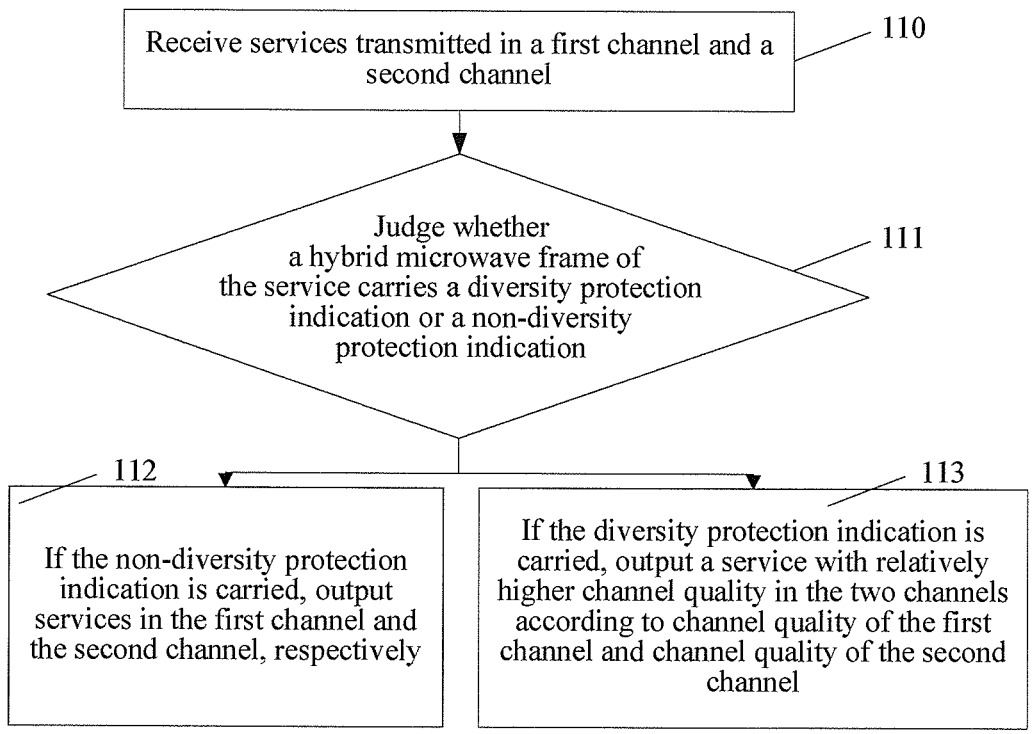
FIG. 11 is a flow chart of a diversity reception method according to Embodiment 6 of the present invention.

Embodiment 6 of the present invention provides a diversity reception method, this diversity reception method corresponds to Embodiment 5, and the received service is transmitted by adopting the method described in Embodiment 5. As shown in FIG. 11, the following steps are specifically included.

Step 110: Receive services transmitted in a first channel and a second channel.

In specific implementation, a microwave reception unit performs frequency conversion, filtering, amplification, analog-to-digital conversion, and demodulation on a received signal to output hybrid microwave frame data.

Step 111: Judge whether a hybrid microwave frame of the service carries a diversity protection indication or a non-diversity protection indication.

The received hybrid microwave frame carries a diversity/non-diversity protection pointer, and the diversity protection or the non-diversity protection may be judged according to the diversity/non-diversity protection pointer.

If the non-diversity protection indication is carried, execute step 112; and if the diversity protection indication is carried, execute step 113.

Step 112: Output services in the first channel and the second channel, respectively.

That is, if the non-diversity protection is adopted, it indicates that services transmitted in the first channel and the second channel are different, and services transmitted in the two channels are directly output, respectively.

Step 113: Output a service with relatively higher channel quality in the two channels according to channel quality of the first channel and channel quality of the second channel.

That is, if it is determined that the diversity protection indication is adopted, it indicates that services transmitted in the first channel and the second channel are the same, and the service with relatively higher channel quality in the two channels is output according to the channel quality of the first channel and the channel quality of the second channel. The channel quality of the first channel and the channel quality of the second channel may be obtained from a microwave deframing unit. The channel quality includes any one or more of the following parameters: receiving power, a signal-to-noise ratio, a demodulation alarm, a bit error rate, and an MSE of the channel.

In the embodiment of the present invention, a diversity protection transmission mode or a non-diversity protection transmission mode is dynamically selected according to the channel quality, thereby improving a spectrum utilization rate of a diversity technology effectively and simultaneously ensuring the reliability of the diversity technology.

Embodiment 7

Figure 12:
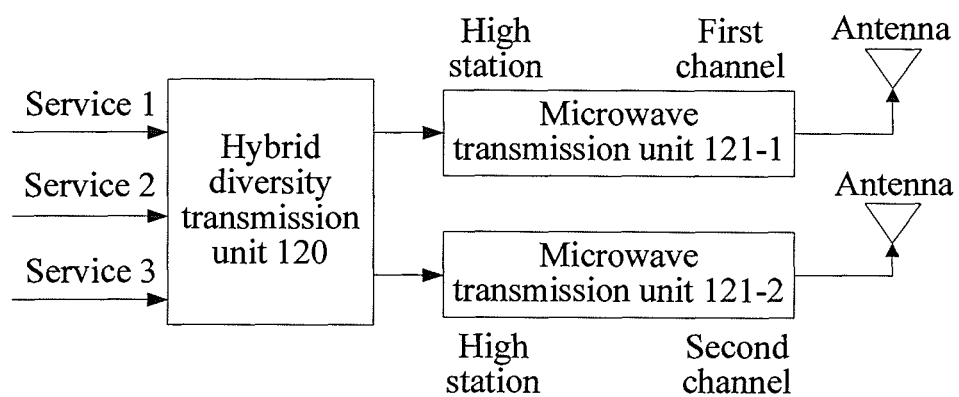
FIG. 12 is a structural diagram of a principle of a diversity transmission apparatus according to Embodiment 7 of the present invention.

Embodiment 7 of the present invention provides a diversity transmission apparatus. The apparatus corresponds to Embodiment 5, and is configured to implement the diversity transmission method described in Embodiment 5. As shown in FIG. 12, the diversity transmission apparatus specifically includes: a hybrid diversity sending and receiving unit 120, a microwave transmission unit 121-1 of a first channel, and a microwave transmission unit 121-2 of a second channel.

The hybrid diversity transmission unit 120 is configured to classify services to be transmitted, where the classifications include a high-priority service and a low-priority service; judge whether both channel quality of the first channel and channel quality of the second channel are higher than a set threshold value, if both the channel quality of the first channel and the channel quality of the second channel are higher than the set threshold value, transport the high-priority service and the low-priority service to the microwave transmission unit of the first channel and the microwave transmission unit of the second channel, respectively, to transmit the high-priority service and the low-priority service in a non-diversity protection way, otherwise, send the high-priority service and service related information to the microwave transmission unit of the first channel and the microwave transmission unit of the second channel at the same time to transmit the high-priority service and service related information in a diversity protection way. It may be understood that, the diversity transmission apparatus may have a receiving function at the same time, where the channel quality of the first channel and the channel quality of the second channel may be obtained through a microwave reception unit of the first channel (not shown in the figure) and a microwave reception unit of the second channel (not shown in the figure), respectively. To highlight the inventive concept of the present invention, the introduction of the existing functions of the transmission apparatus is omitted in the embodiment.

The microwave transmission unit 121-1 is configured to receive, and through the first channel, transmit a service obtained from the hybrid diversity transmission unit 120.

The microwave transmission unit 121-2 is configured to receive, and through the second channel, transmit a service obtained from the hybrid diversity transmission unit 120.

Figure 13:
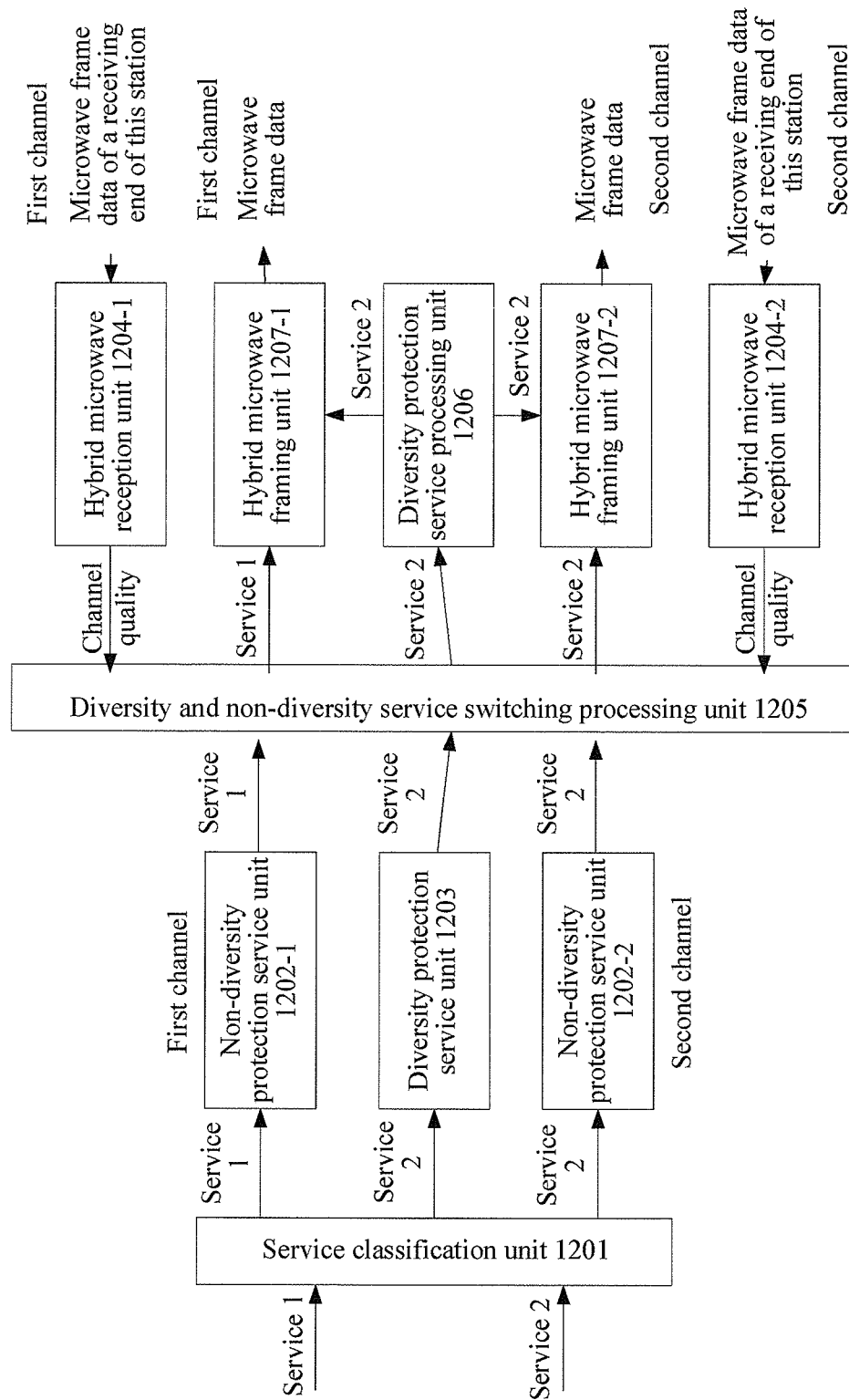
FIG. 13 is a schematic structural diagram of hybrid microwave transmission and reception units in a diversity transmission apparatus according to Embodiment 7 of the present invention.

As shown in FIG. 13, the hybrid microwave transmission unit 120 described in the embodiment of the present invention may further include: a service classification unit 1201, a non-diversity protection service unit 1202-1 of the first channel, a non-diversity protection service unit 1202-2 of the second channel, a diversity protection service unit 1203, a hybrid microwave reception unit 1204-1 of the first channel, a hybrid microwave reception unit 1204-2 of the second channel, a diversity and non-diversity service switching processing unit 1205, a diversity protection service processing unit 1206, a hybrid microwave framing unit 1207-1 of the first channel, a hybrid microwave framing unit 1207-2 of the second channel.

The service classification unit 1201 is configured to classify services to be transmitted, transport the classified high-priority service to the diversity protection service unit 1203 and transport the classified high-priority service to one of the non-diversity protection service unit 1202-1 of the first channel and the non-diversity protection service unit 1202-2 of the second channel, and transport the classified low-priority service to the other of the non-diversity protection service unit 1202-1 of the first channel and the non-diversity protection service unit 1202-2 of the second channel. For example, there are two services, namely, a service 1 and a service 2, it is determined through classification that the service 1 is the low-priority service and the service 2 is the high-priority service. The service 1 is transported to the non-diversity protection service unit 1202-1 of the first channel, and the service 2 is transported to the diversity protection service unit 1203 and the non-diversity protection service unit 1202-2 that is of the second channel at the same time; the classification method of the service classification unit 1201 is the same as that in the description of Embodiment 5, which is not repeatedly described here again.

The hybrid microwave reception unit 1204-1 of the first channel is configured to send the channel quality of the first channel to the diversity and non-diversity service switching processing unit 1205; the channel quality includes any one or more of the following parameters: receiving power, a signal-to-noise ratio, a demodulation alarm, a bit error rate, and an MSE of the channel.

The hybrid microwave reception unit 1204-2 of the second channel is configured to send the channel quality of the second channel to the diversity and non-diversity service switching processing unit 1205.

The diversity and non-diversity service switching processing unit 1205 is configured to select a transmission mode according to the channel quality of the first channel and the channel quality of the second channel, if both the channel quality of the first channel and the channel quality of the second channel are higher than the set threshold value, select a non-diversity protection transmission mode, that is, obtain a service of the non-diversity protection service unit 1202-1 of the first channel, and transport the service to a hybrid microwave framing unit 1206-1 of the first channel, and obtain a service of the non-diversity protection service unit 1202-2 of the second channel, and transport the service to a hybrid microwave framing unit 1206-2 of the second channel; otherwise, adopt a diversity protection transmission mode, that is, obtain the high-priority service and service related information in the diversity protection service unit 1203, and transport the service and information to the diversity protection service processing unit 1206.

The diversity protection service processing unit 1206 is configured to send the obtained high-priority service and related information to the hybrid microwave framing unit 1206-1 of the first channel and the hybrid microwave framing unit 1206-2 of the second channel at the same time, and transmit the high-priority service in a diversity protection way.

A hybrid microwave framing unit 1207-1 of the first channel is configured to form the obtained service into a hybrid microwave frame and transport the hybrid microwave frame to the microwave transmission unit 121-1, and the hybrid microwave framing unit 1207-1 of the first channel transports the formed hybrid microwave frame to the microwave transmission unit 121-1 of the first channel.

A hybrid microwave framing unit 1207-2 of the second channel is configured to form the obtained service into a hybrid microwave frame and transport the hybrid microwave frame to the microwave transmission unit 121-2, and the hybrid microwave framing unit 1207-2 of the second channel transports the formed hybrid microwave frame to the microwave transmission unit 121-2 of the second channel.

A format of the hybrid microwave frame described in the embodiment of the present invention is the same as that in the description of Embodiment 5, which is not repeatedly described here again.

In the embodiment of the present invention, the diversity protection transmission mode or the non-diversity protection transmission mode is dynamically selected according to the channel quality, thereby improving a spectrum utilization rate of a diversity technology effectively and simultaneously ensuring the reliability of the diversity technology.

Embodiment 8

Figure 14:
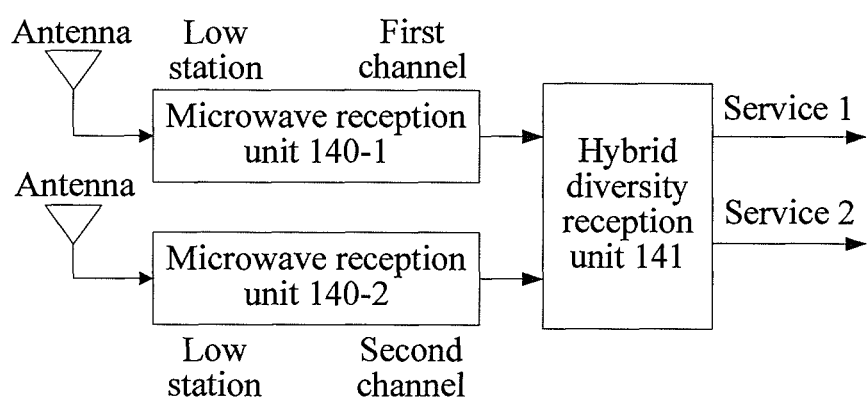
FIG. 14 is a structural diagram of a principle of a diversity reception apparatus according to Embodiment 8 of the present invention.

Embodiment 8 of the present invention provides a diversity reception apparatus. The apparatus corresponds to Embodiment 6, and is the apparatus which implements the diversity reception method described in Embodiment 6. As shown in FIG. 14, the diversity reception apparatus specifically includes: a microwave reception unit 140-1 of a first channel, a microwave reception unit 140-2 of a second channel, and a hybrid diversity reception unit 141.

The microwave reception unit 140-1 of the first channel is configured to receive a service transmitted in the first channel, obtain microwave frame data after demodulation, and transport the microwave frame data to the hybrid diversity reception unit 141. A specific operation of the microwave reception unit 140-1 of the first channel includes: after receiving a signal transmitted in the first channel through an antenna, performing operations such as frequency conversion, filtering, amplification, analog-to-digital conversion, and demodulation, and finally outputting the microwave frame data and transporting the microwave frame data to the hybrid diversity reception unit 141.

The microwave reception unit 140-2 of the second channel is configured to receive a service transmitted in the second channel, obtain the microwave frame data after demodulation, and transport the microwave frame data to the hybrid diversity reception unit 141. A specific operation of the microwave reception unit 140-2 of the second channel includes: after receiving a signal transmitted in the second channel through an antenna, performing operations such as frequency conversion, filtering, amplification, analog-to-digital conversion, and demodulation, and finally outputting the microwave frame data and transporting the microwave frame data to the hybrid diversity reception unit 141.

The hybrid diversity reception unit 141 is configured to judge whether a hybrid microwave frame of the service carries a diversity protection indication or a non-diversity protection indication; if the non-diversity protection indication is carried, output services in the first channel and the second channel, respectively; and if the diversity protection indication is carried, output a service with relatively higher channel quality in the two channels according to channel quality of the first channel and channel quality of the second channel.

Figure 15:
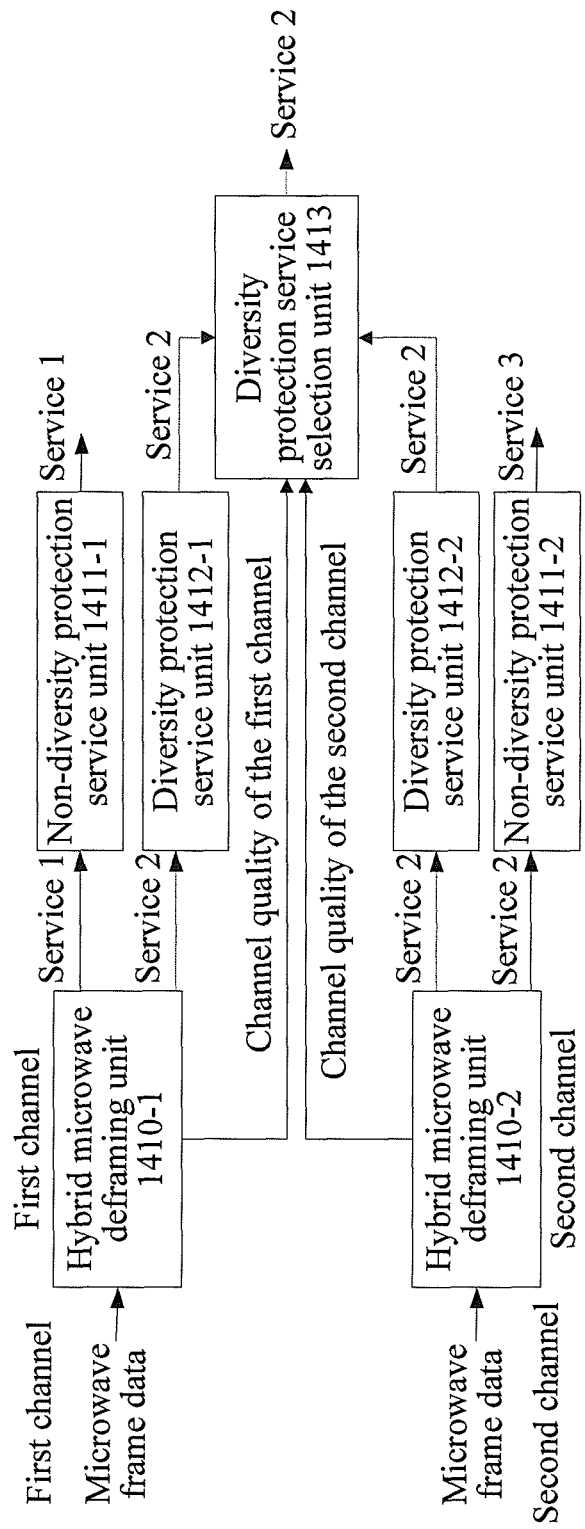
FIG. 15 is a schematic structural diagram of a hybrid diversity reception unit in a diversity reception apparatus according to Embodiment 8 of the present invention.

As shown in FIG. 15, the hybrid diversity reception unit 141 described in the embodiment of the present invention may further include: a hybrid microwave deframing unit 1410-1 of the first channel, a hybrid microwave deframing unit 1410-2 of the second channel, a non-diversity protection service unit 1411-1 of the first channel, a non-diversity protection service unit 1411-2 of the second channel, a diversity protection service unit 1412-1 of the first channel, a diversity protection service unit 1412-2 of the second channel, and a diversity protection service selection unit 1413.

The hybrid microwave deframing unit 1410-1 of the first channel is configured to determine whether a service transmitted in the first channel adopts a diversity protection mode according to a diversity protection pointer or a non-diversity protection pointer in a microwave frame of the first channel, if the microwave frame carries the diversity protection pointer which indicates that the diversity protection is adopted, send a service of the first channel to the diversity protection service unit 1412-1 of the first channel; otherwise, send the service of the first channel to the non-diversity protection service unit 1411-1 of the first channel; and send the channel quality of the first channel to the diversity protection service selection unit 1413. For example, in FIG. 15, the hybrid microwave deframing unit 1410-1 of the first channel, according to the diversity protection pointer in a hybrid microwave frame in the first channel, determines that the diversity protection is adopted, and a service 2 is transmitted, and then sends the service 2 transmitted in the first channel to the diversity protection service unit 1412-1 of the first channel, which is shown by dotted lines in FIG. 15. If it is determined that non-diversity protection is adopted, and a service 1 is transmitted, the service 1 is sent to the non-diversity protection service unit 1411-1 of the first channel, which is shown by solid lines in FIG. 15. In addition, the hybrid microwave deframing unit 1410-1 of the first channel may further obtain the channel quality of the first channel, and send the channel quality of the first channel to the diversity protection service selection unit 1413. The channel quality includes any one or more of the following parameters: receiving power, a signal-to-noise ratio, a demodulation alarm and a bit error rate, and an MSE of the channel.

The hybrid microwave deframing unit 1410-2 of the second channel is configured to determine whether the service transmitted in the second channel adopts a diversity protection mode according to a diversity protection pointer or a non-diversity protection pointer in a microwave frame of the second channel, if the microwave frame carries the diversity protection pointer which indicates that the diversity protection is adopted, send a service of the second channel to the diversity protection service unit 1412-2 of the second channel; otherwise, send the service of the second channel to the non-diversity protection service unit 1411-2 of the second channel; and send the channel quality of the second channel to the diversity protection service selection unit 1413. For example, in FIG. 15, the hybrid microwave deframing unit 1410-2 of the second channel, according to the non-diversity protection pointer in a hybrid microwave frame in the second channel, determines that the non-diversity protection is adopted, and a service 2 is transmitted, and then sends the service 2 transmitted in the second channel to the non-diversity protection service unit 1411-2 of the second channel, which is shown by solid lines in FIG. 15. In addition, the hybrid microwave deframing unit 1410-2 of the second channel may further obtain the channel quality of the second channel, and send the channel quality of the second channel to the diversity protection service selection unit 1413. The channel quality includes any one or more of the following parameters: receiving power, a signal-to-noise ratio, a demodulation alarm and a bit error rate, and an MSE of the channel.

The non-diversity protection service unit 1411-1 of the first channel and the non-diversity protection service unit 1411-2 of the second channel are configured to output the received non-diversity protection services. As shown by solid lines in FIG. 15, the non-diversity protection service unit 1411-1 of the first channel directly outputs the service 1, and the non-diversity protection service unit 1411-2 of the second channel directly outputs a service 3.

The diversity protection service unit 1412-1 of the first channel is configured to transport a diversity protection service of the first channel to the diversity protection service selection unit 1413.

The high-priority service unit 1412-2 of the second channel is configured to transport a diversity protection service of the second channel to the diversity protection service selection unit 1413.

The diversity protection service selection unit 1413 is configured to select and output a high-priority service with relatively higher channel quality in the two channels according to the channel quality of the first channel and the channel quality of the second channel. The diversity protection service selection unit 1413, after obtaining the channel quality of the two channels from the hybrid microwave deframing unit 1410-1 of the first channel and the hybrid microwave deframing unit 1410-2 of the second channel, judges the channel quality of which channel is relatively higher, so as to output the high-priority service of the corresponding channel. For example, the receiving power of the channel, is judged to determine that the channel quality of the first channel is higher than the channel quality of the second channel, a diversity service 2 transmitted in the first channel is output; otherwise, the diversity protection service 2 transmitted in the second channel is output.

It may be understood that, to highlight the inventive concept of the present invention, the introduction of functions of some existing structures is omitted in this embodiment. And the diversity reception apparatus may also act as the diversity transmission apparatus at the same time, which is specifically as the structure of the diversity transmission apparatus described in Embodiment 7.

In the embodiment of the present invention, it is implemented that a spectrum utilization rate is effectively improved and the reliability of diversity transmission of the high-priority service is simultaneously ensured.

Embodiment 9

Embodiment 9 of the present invention provides a diversity transmission system, which includes: a diversity transmission apparatus and a diversity reception apparatus.

The diversity transmission apparatus is configured to classify services to be transmitted, where the classifications include a high-priority service and a low-priority service; transport the high-priority service to a first channel and a second channel at the same time to transmit the high-priority service in a diversity protection way, and transport the low-priority service to the first channel or the second channel to transmit the low-priority service in a non-diversity protection way. The diversity transmission apparatus described in this embodiment corresponds to Embodiment 3, and its specific structure and functions are not repeatedly described here again.

The diversity reception apparatus is configured to receive services transmitted in the first channel and the second channel, separate the high-priority service and the low-priority service in the first channel and the second channel; output the low-priority service, and output a high-priority service with relatively higher channel quality in the two channels according to channel quality of the first channel and channel quality of the second channel. The diversity reception apparatus described in this embodiment corresponds to Embodiment 4; and its specific structure and functions are not repeatedly described here again.

The diversity transmission apparatus described in the embodiment of the present invention classifies the services to be transmitted into the high-priority service and the low-priority service, a diversity protection function is adopted for the high-priority service, and the low-priority service is transmitted in a non-diversity protection way; it is implemented that a spectrum utilization rate is effectively improved and the reliability of diversity transmission of the high-priority service is simultaneously ensured.

Embodiment 10

Embodiment 10 of the present invention provides a diversity transmission system, which includes: a diversity transmission apparatus and a diversity reception apparatus.

The diversity transmission apparatus is configured to classify services to be transmitted, where the classifications include a high-priority service and a low-priority service; judge whether both channel quality of a first channel and channel quality of a second channel are higher than a set threshold value, if both the channel quality of the first channel and the channel quality of the second channel are higher than the set threshold value, send the high-priority service and the low-priority service to the first channel and the second channel, respectively, to transmit the high-priority service and the low-priority service in a non-diversity protection way, and a non-diversity protection indication is carried in a transmitted hybrid microwave frame; otherwise, send the high-priority service and service related information to the first channel and the second channel at the same time to transmit the high-priority service and service related information in a diversity protection way, and a diversity protection indication is carried in a transmitted hybrid microwave frame. The diversity transmission apparatus described in this embodiment corresponds to Embodiment 7, and its specific structure and functions are not repeatedly described here again.

The diversity reception apparatus is configured to receive services transmitted in the first channel and the second channel; judge whether a hybrid microwave frame of the service carries the diversity protection indication or the non-diversity protection indication; if the non-diversity protection indication is carried, output services in the first channel and the second channel, respectively; if the diversity protection indication is carried, output a service with relatively higher channel quality in the two channels according to the channel quality of the first channel and the channel quality of the second channel. The diversity reception apparatus described in this embodiment corresponds to Embodiment 8, and its specific structure and functions are not repeatedly described here again.

In the embodiment of the present invention, a diversity protection transmission mode or a non-diversity protection transmission mode is dynamically selected according to the channel quality, and it is implemented that a spectrum utilization rate is effectively improved and the reliability of the diversity transmission of the high-priority service is simultaneously ensured.

In conclusion, in the embodiments of the present invention, it is implemented that the spectrum utilization rate is effectively improved and the reliability of diversity transmission of the high-priority service is simultaneously ensured.

Persons of ordinary skill in the art may understand that all or a part of the steps of the methods according to the foregoing embodiments may be implemented by a program instructing relevant hardware. The program may be stored in a computer readable storage medium, such as a read-only memory (abbreviated as ROM), a random access memory (abbreviated as RAM), a magnetic disk, or a compact disk.

The foregoing descriptions are merely exemplary and specific implementation manners of the present invention, which are not intended to limit the protection scope of the present invention. Any variation or replacement that can be easily thought of by persons skilled in the art within the technical scope disclosed in the present invention shall fall within the protection scope of the present invention. Therefore, the protection scope of the present invention should be subject to the protection scope of the claims.

What is claimed is:

1. A diversity transmission method, comprising:
   classifying services to be transmitted, wherein the classifications comprise a high-priority service and a low-priority service;
   transporting the high-priority service to a first channel and a second channel at the same time to transmit the high-priority service in a diversity protection way, and transporting the low-priority service to the first channel or the second channel to transmit the low-priority service in a non-diversity protection way;
   wherein in the first channel or the second channel, the low-priority service and the high-priority service form a hybrid microwave frame for transmission; and
   wherein the hybrid microwave frame carries a diversity service pointer, and the diversity service pointer is used to indicate a start address and a length of a diversity service, or the hybrid microwave frame carries a non-diversity service pointer, and the non-diversity service pointer is used to indicate a start address and a length of a non-diversity service.

2. A diversity reception method, comprising:
   receiving services transmitted in a first channel and a second channel;
   demodulating a hybrid microwave frame of services transmitted in the first channel and the second channel, wherein the hybrid microwave frame carries a diversity service pointer and the diversity service pointer is used to indicate a start address and a length of a diversity service, or the hybrid microwave frame carries a non-diversity service pointer and the non-diversity service pointer is used to indicate a start address and a length of a non-diversity service;
   separating a high-priority service and a low-priority service in the first channel and the second channel according to the diversity service pointer or the non-diversity service pointer; and
   outputting the low-priority service, and outputting a high-priority service with relatively higher channel quality in the two channels according to channel quality of the first channel and channel quality of the second channel.

3. A diversity transmission apparatus, comprising:
   a hybrid diversity transmission unit comprising a service classification unit, a low-priority service unit of a first channel, a low-priority service unit of a second channel, a high-priority service unit, a diversity protection processing unit, a microwave framing unit of the first channel and a microwave framing unit of the second channel; and
   a microwave transmission unit of a first channel, and a microwave transmission unit of a second channel, wherein:
   the hybrid diversity transmission unit is configured to classify services to be transmitted, wherein the classifications comprise a high-priority service and a low-priority service; transport the high-priority service to the microwave transmission unit of the first channel and the microwave transmission unit of the second channel at the same time to transmit the high-priority service in a diversity protection way, and transport the low-priority service to the microwave transmission unit of the first channel or the microwave transmission unit of the second channel to transmit the low-priority service in a non-diversity protection way;
   the service classification unit is configured to classify services to be transmitted, transport the classified high-priority service to the high-priority service unit, and transport the classified low-priority service to the low-priority service unit of the first channel or the low-priority service unit of the second channel;
   the low-priority service unit of the first channel is configured to receive the low-priority service which is of the first channel and is transported by the service classification unit, and extract related information of the low-priority service of the first channel;
   the low-priority service unit of the second channel is configured to receive the low-priority service which is of the second channel and is transported by the service classification unit, and extract related information of the low-priority service of the second channel;

the high-priority service unit is configured to receive the high-priority service transported by the service classification unit, and extract related information of the high-priority service;

the diversity protection unit is configured to transport the high-priority service and the service related information in the high-priority service unit to the hybrid microwave framing unit of the first channel and the hybrid microwave framing unit of the second channel at the same time;

the hybrid microwave framing unit of the first channel is configured to form the low-priority service in the low-priority service unit of the first channel and the high-priority service sent by the diversity protection unit into a hybrid microwave frame;

the hybrid microwave framing unit of the second channel is configured to form the low-priority service in the low-priority service unit of the second channel and the high-priority service sent by the diversity protection unit into a hybrid microwave frame; and wherein the hybrid microwave frame comprises the following fields:
- a microwave frame header, a microwave frame overhead, a diversity service pointer, a diversity service area, and a non-diversity service area, wherein the diversity service pointer is used to indicate a start address and a length of a diversity service; or
- a microwave frame header, a microwave frame overhead, a non-diversity service pointer, a non-diversity service area, and a diversity service area, wherein the non-diversity service pointer is used to indicate a start address and a length of a non-diversity service;

the microwave transmission unit of the first channel is configured to receive, and through the first channel, transmit the service obtained from the hybrid diversity transmission unit; and the microwave transmission unit of the second channel is configured to receive, and through the second channel, transmit the service obtained from the hybrid diversity transmission unit.

4. A diversity reception apparatus, comprising:

a microwave reception unit of a first channel and a microwave reception unit of a second channel; and a hybrid diversity reception unit comprising a hybrid microwave deframing unit of the first channel, a hybrid microwave deframing unit of the second channel, a low-priority service unit of the first channel, a low-priority service unit of the second channel, a high-priority service unit of the first channel, a high-priority service unit of the second channel, and a diversity protection service selection unit; wherein:

the microwave reception unit of the first channel is configured to receive a service transmitted in the first channel, obtain microwave frame data after demodulation, and transport the microwave frame data to the hybrid diversity reception unit;

the microwave reception unit of the second channel is configured to receive a service transmitted in the second channel, obtain microwave frame data after demodulation, and transport the microwave frame data to the hybrid diversity reception unit;

the hybrid diversity reception unit is configured to separate a high-priority service and a low-priority service in the first channel and the second channel; output the low-priority service, and output a high-priority service with relatively higher channel quality in the two channels according to channel quality of the first channel and channel quality of the second channel;

the hybrid microwave deframing unit of the first channel is configured to separate the high-priority service and the low-priority service in the first channel according to a diversity service pointer or a non-diversity service pointer in a microwave frame of the first channel, send the separated low-priority service to the low-priority service unit of the first channel, send the high-priority service to the high-priority service unit of the first channel; and send the channel quality of the first channel to the diversity protection service selection unit;

the hybrid microwave deframing unit of the second channel is configured to separate the high-priority service and the low-priority service in the second channel according to a diversity service pointer in a microwave frame of the second channel, send the separated low-priority service to the low-priority service unit of the second channel, and send the high-priority service to the high-priority service unit of the second channel; and send the channel quality of the second channel to the diversity protection service selection unit;

the low-priority service unit of the first channel and the low-priority service unit of the second channel are configured to output the received low-priority service;

the high-priority service unit of the first channel is configured to transport the high-priority service separated by the hybrid microwave deframing unit of the first channel to the diversity protection service selection unit;

the high-priority service unit of the second channel is configured to transport the high-priority service separated by the hybrid microwave deframing unit of the second channel to the diversity protection service selection unit; and the diversity protection service selection unit is configured to select and output the high-priority service with the relatively higher channel quality in the two channels according to the channel quality of the first channel and the channel quality of the second channel.

* * * * *